United States Patent
Deng (10) Patent No.: US 9,274,982 B2
(45) Date of Patent: Mar. 1, 2016

(54) SWITCH CIRCUIT

(75) Inventor: Jian-Ping Deng, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 730 days.

(21) Appl. No.: 13/572,656

(22) Filed: Aug. 12, 2012

(65) Prior Publication Data
US 2013/0285474 A1    Oct. 31, 2013

(30) Foreign Application Priority Data
Apr. 27, 2012    (CN) .......................... 2012 1 0127806

(51) Int. Cl.
*H01H 9/54*    (2006.01)
*G06F 13/16*    (2006.01)

(52) U.S. Cl.
CPC ............. *G06F 13/16* (2013.01); *Y10T 307/832* (2015.04)

(58) Field of Classification Search
USPC ........................................................ 307/126
See application file for complete search history.

(56) References Cited

U.S. PATENT DOCUMENTS

| | | | | |
|---|---|---|---|---|
| 3,609,479 A | * | 9/1971 | Lin et al. ........................ | 257/370 |
| 3,703,710 A | * | 11/1972 | Kubo et al. .................... | 365/226 |
| 4,627,035 A | * | 12/1986 | Yashiro ..................... | 365/230.04 |
| 5,874,785 A | * | 2/1999 | Liu .............................. | 307/10.5 |
| 6,025,775 A | * | 2/2000 | Erlandson .................... | 340/436 |
| 2008/0258927 A1 | * | 10/2008 | Chen et al. .................... | 340/661 |
| 2011/0093222 A1 | * | 4/2011 | Xiong ............................. | 702/60 |
| 2012/0249215 A1 | * | 10/2012 | Wang ............................ | 327/434 |

OTHER PUBLICATIONS

Philips 74HC/HCT4052 Dual 4-channel analog multiplexer/demultiplexer data sheet, dated Dec. 1990.*

* cited by examiner

*Primary Examiner* — Thienvu Tran
*Assistant Examiner* — Brian K Baxter
(74) *Attorney, Agent, or Firm* — Novak Druce Connolly Bove + Quigg LLP (57) ABSTRACT

A switch circuit for switching between a first storage and a second storage. The switch circuit includes a switch, first and second control circuits, a switch control chip, and a processing chip. When the second control circuit transmits power from a power supply to the first storage, the first control circuit connects the power supply to the first storage, and connects the second control circuit to the processing chip the first storage regardless of the state of the switch. When the second control circuit transmits power from the power supply to the second storage, the first control circuit connects the power supply to the second storage, and connects the processing chip to the second storage regardless of the state of the switch.

5 Claims, 9 Drawing Sheets

SWITCH CIRCUIT

BACKGROUND

1. Technical Field

The present disclosure relates to a switch circuit.

2. Description of Related Art

Dual systems are used for protecting information stored in handheld devices. Users can store important information in one system, and store general information in the other system. Software is generally used to switch the handheld device between the two systems. However, there are security risks.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
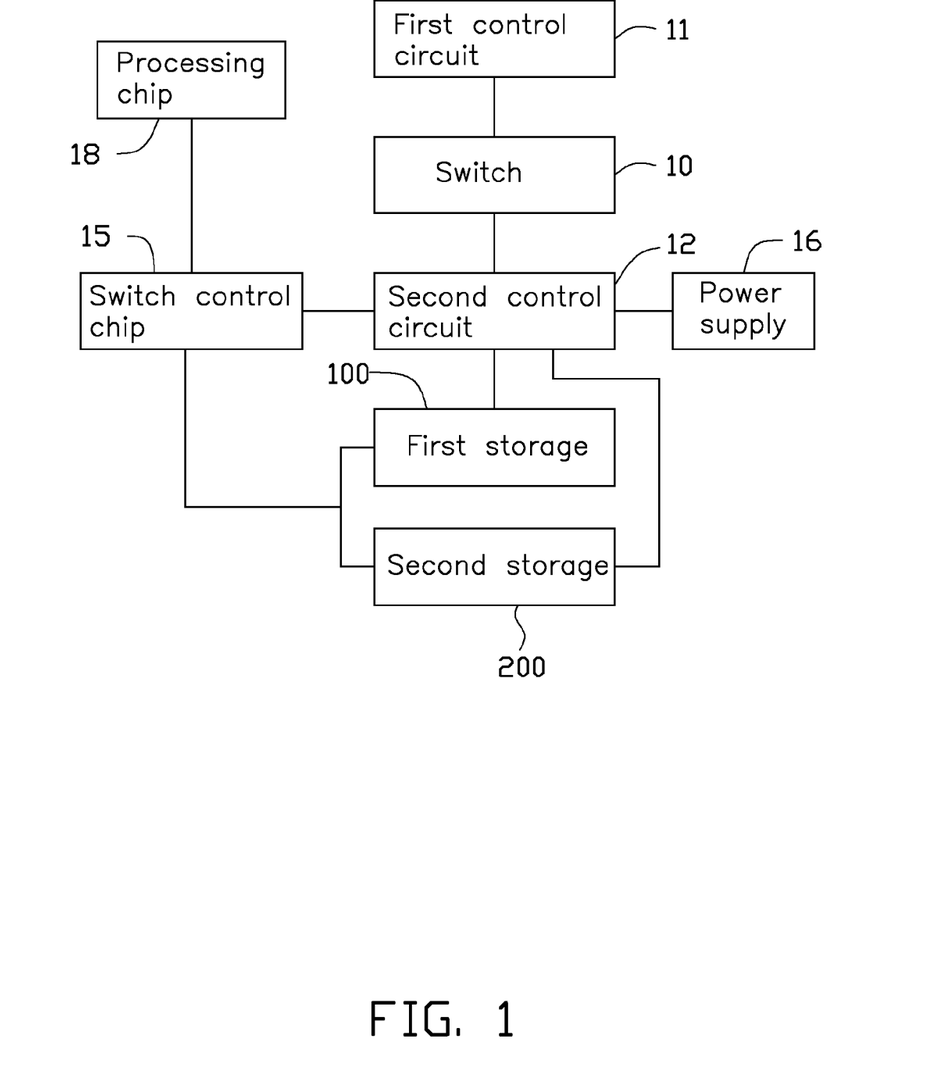
FIG. 1 is a block diagram of an exemplary embodiment of a switch circuit.

Referring to FIG. 1, an exemplary embodiment of a switch circuit is shown. The switch circuit includes a switch 10, a first control circuit 11, a second control circuit 12, a switch control chip 15, and a processing chip 18.

The switch 10 is connected to the first control circuit 11 and the second control circuit 12. The second control circuit 12 is further connected to a first storage 100, a second storage 200, and a power supply 16. The second control circuit 12 either outputs power from the power supply 16 to the first storage 100 or outputs power from the power supply 16 to the second storage 200 according to the switch 10. The second control circuit 12 is further connected to the switch control chip 15. The switch control chip 15 is connected to the processing chip 18. The switch control chip 15 is further connected to the first and second storages 100 and 200. The second control circuit 12 further controls the switch control chip 15 according to the switch 10. The switch control chip 15 allows transmitting of data between the processing chip 18 and the first storage 100 or between the processing chip 18 and the second storage 200. In one embodiment, the power supply 16 is a power supply V3.3, which can provide 3.3 volts.

Figure 2:
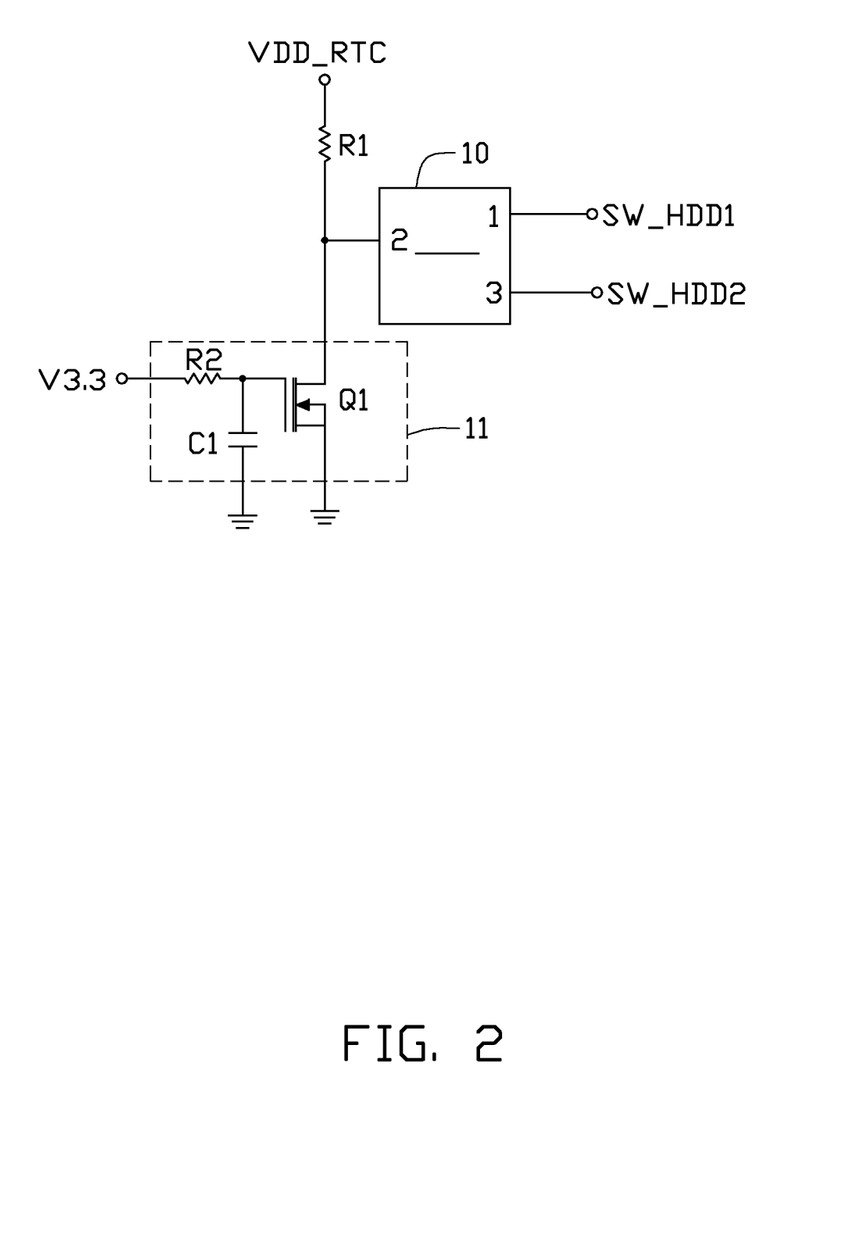
FIGS. 2-9 are circuit diagrams of the switch circuit of FIG. 1.
Figure 3:
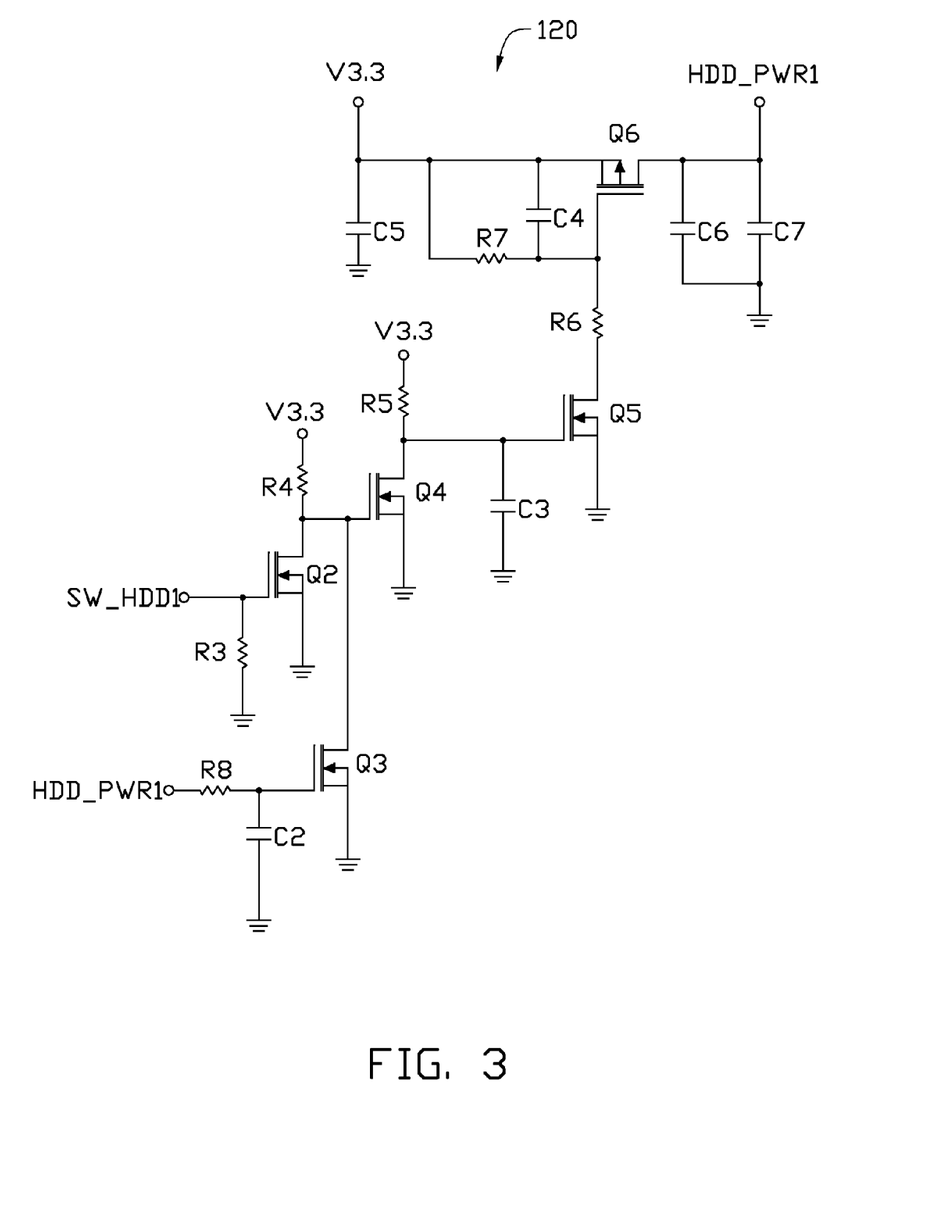
Figure 4:
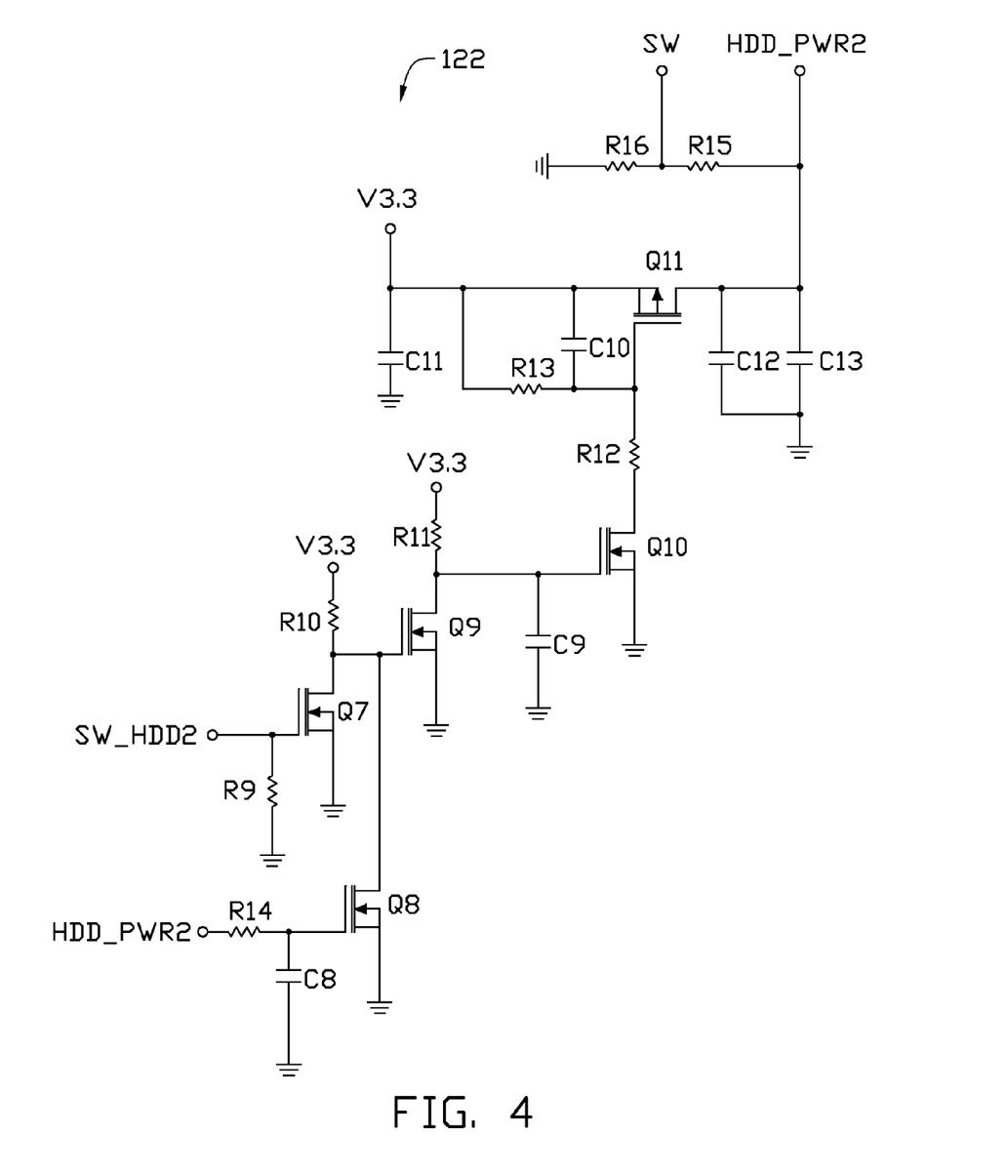

Referring to FIGS. 2-4, the switch 10 is a single pole double throw switch. The first control circuit 11 includes an n-channel metal oxide semiconductor field effect transistor (MOSFET) Q1. The second control circuit 12 includes a first accessory circuit 120 and a second accessory circuit 122. A pole 2 of the switch 10 is connected to a power supply VDD_RTC through a resistor R1. A first throw 1 of the switch 10 is connected to the first accessory circuit 120. A second throw 3 of the switch 10 is connected to the second accessory circuit 122. The pole 2 is further connected to a drain of the MOSFET Q1. A source of the MOSFET Q1 is grounded. A gate of the MOSFET Q1 is connected to the power supply V3.3 through a resistor R2. The gate of the MOSFET Q1 is further grounded through a capacitor C1.

When the pole 2 contacts the first throw 1, the first accessory circuit 120 supplies power to the first storage 100, and data can be transmitted between the processing chip 18 and the first storage 100. When the pole 2 contacts the second throw 3, the second accessory circuit 122 supplies power to the second storage 200, and data can be transmitted between the processing chip 18 and the second storage 200.

Figure 8:
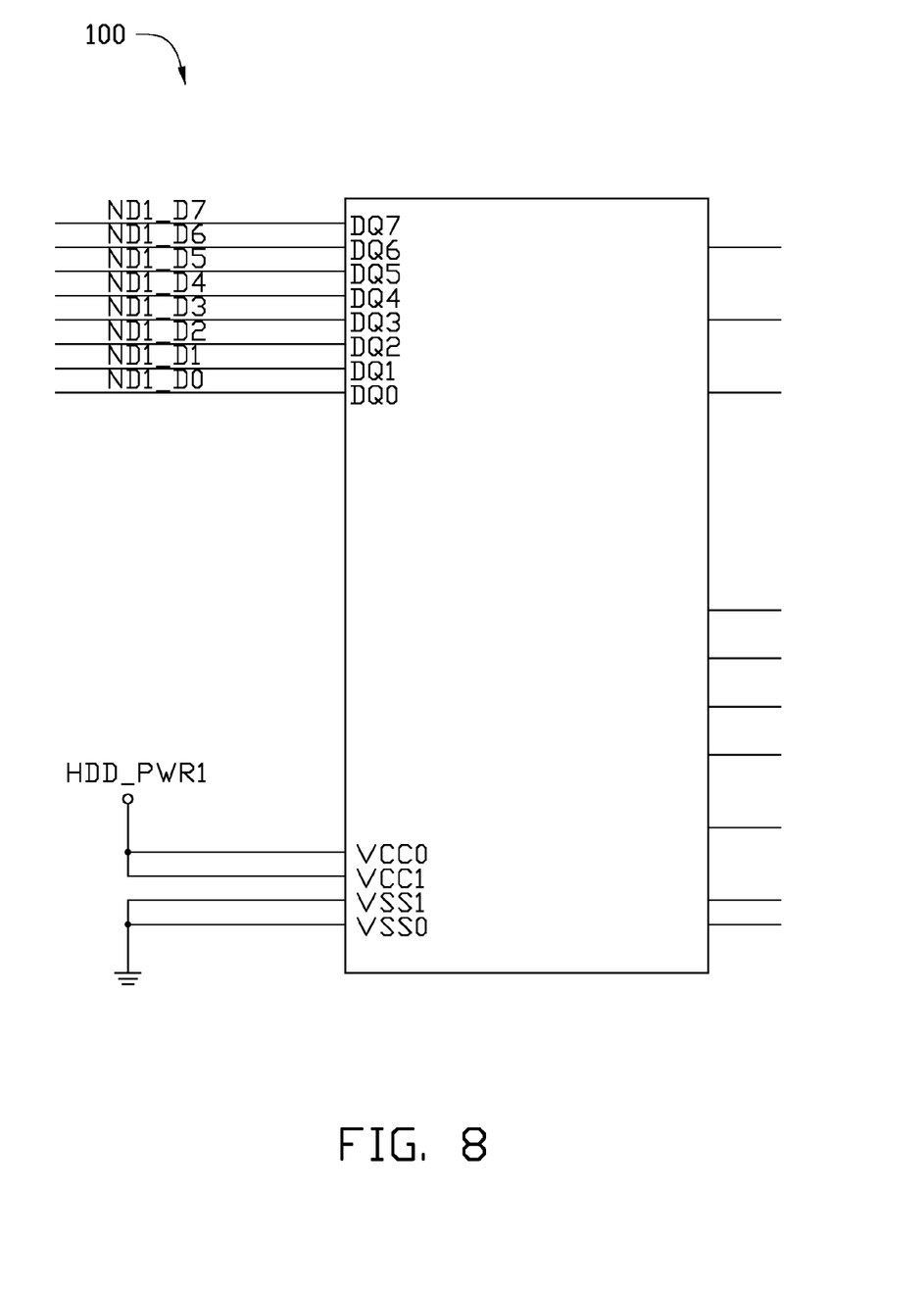

Referring to FIG. 3, the first accessory circuit 120 includes n-channel MOSFETs Q2-Q5 and a p-channel MOSFET Q6. The first throw 1 is grounded through a resistor R3. The first throw 1 is further connected to a gate of the MOSFET Q2. A source of the MOSFET Q2 is grounded. A drain of the MOSFET Q2 is connected to the power supply V3.3 through a resistor R4. The drain of the MOSFET Q2 is connected to a drain of the MOSFET Q3. A source of the MOSFET Q3 is grounded. A gate of the MOSFET Q3 is grounded through a capacitor C2. The drain of the MOSFET Q2 is connected to a gate of the MOSFET Q4. A source of the MOSFET Q4 is grounded. A drain of the MOSFET Q4 is connected to the power supply V3.3 through a resistor R5. The drain of the MOSFET Q4 is grounded through a capacitor C3. The drain of the MOSFET Q4 is further connected to a gate of the MOSFET Q5. A source of the MOSFET Q5 is grounded. A drain of the MOSFET Q5 is connected to the power supply V3.3 through resistors R6 and R7 connected in series. A node between the resistors R6 and R7 is connected to a gate of the MOSFET Q6. The node between the resistors R6 and R7 is further connected to a source of the MOSFET Q6 through a capacitor C4. The power supply V3.3 is further grounded through a capacitor C5. A drain of the MOSFET Q6 is grounded through capacitors C6 and C7 connected in parallel. The drain of the MOSFET Q6 is further connected to power terminals VCC0 and VCC1 of the first storage 100 (shown in FIG. 8) for outputting a first power signal HDD_PWR1 to the first storage 100. The gate of the MOSFET Q3 is further connected to the drain of the MOSFET Q6 through a resistor R8.

Figure 9:
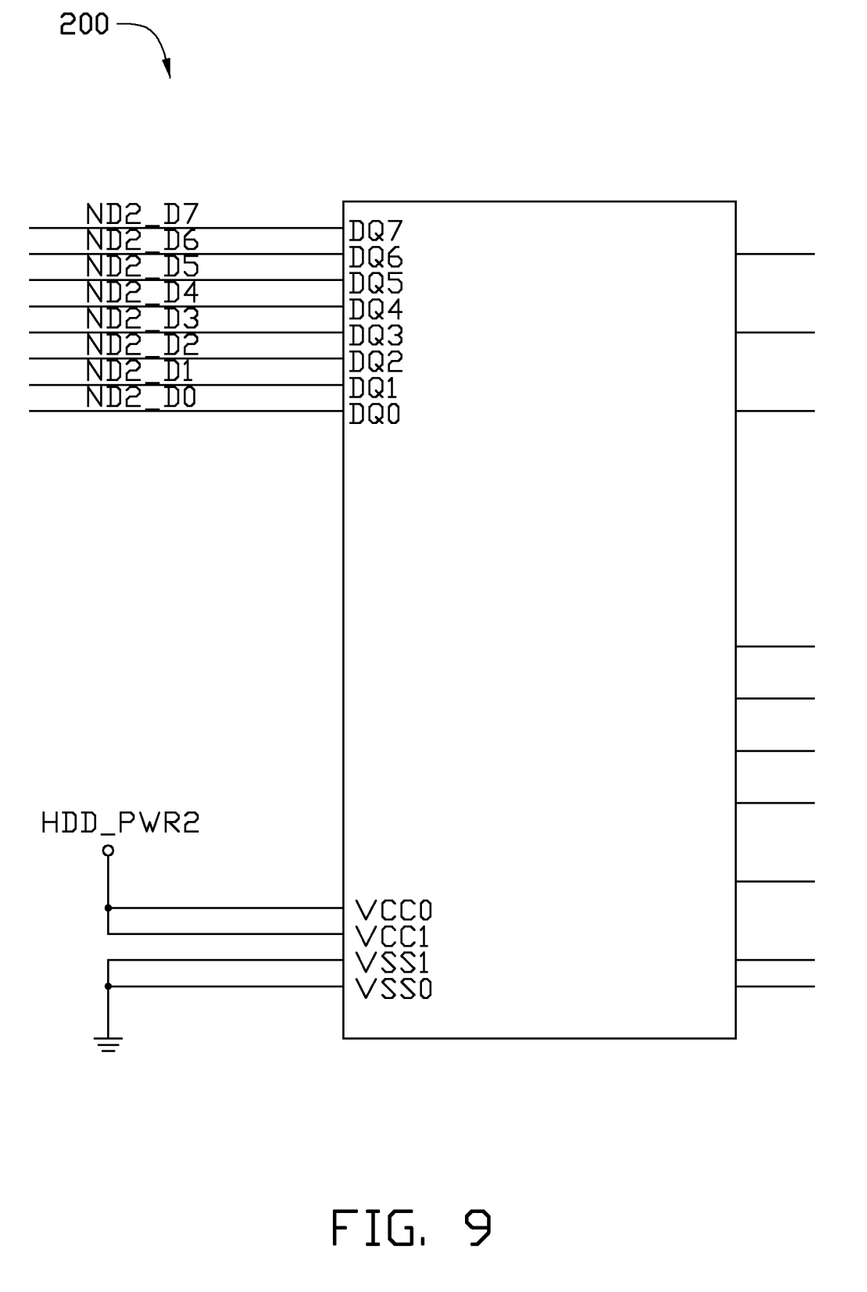

Referring to FIG. 4, the second accessory circuit 122 includes an n-channel MOSFETs Q7-Q10 and a p-channel MOSFET Q11. The second throw 3 of the switch 10 is grounded through a resistor R9. The second throw 3 is further connected to a gate of the MOSFET Q7. A source of the MOSFET Q7 is grounded. A drain of the MOSFET Q7 is connected to the power supply V3.3 through a resistor R10. The drain of the MOSFET Q7 is further connected to a drain of the MOSFET Q8. A source of the MOSFET Q8 is grounded. A gate of the MOSFET Q8 is grounded through a capacitor C8. The drain of the MOSFET Q7 is connected to a gate of the MOSFET Q9. A source of the MOSFET Q9 is grounded. A drain of the MOSFET Q9 is connected to the power supply V3.3 through a resistor R11. The drain of the MOSFET Q9 is further grounded through a capacitor C9. The drain of the MOSFET Q9 is further connected to a gate of the MOSFET Q10. A source of the MOSFET Q10 is grounded. A drain of the MOSFET Q10 is connected to the power supply V3.3 through resistors R12 and R13 connected in series. A node between the resistors R12 and R13 is connected to a gate of the MOSFET Q11. The node between the resistors R12 and R13 is further connected to a source of the MOSFET Q11 through a capacitor C10. The power supply V3.3 is further grounded through a capacitor C11. A drain of the MOSFET Q11 is grounded through capacitors C12 and C13 connected in parallel. The drain of the MOSFET Q11 is connected to power terminals VCC0 and VCC1 of the second storage 200 (shown in FIG. 9) for outputting a second power signal HDD_PWR2 to the second storage 200. The gate of the MOSFET Q8 is further connected to the drain of the MOSFET Q11 through a resistor R14. The drain of the MOSFET Q11 is further grounded through resistors R15 and R16 connected in series. A node between the resistors R15 and R16 is for outputting a control signal SW.

Figure 5:
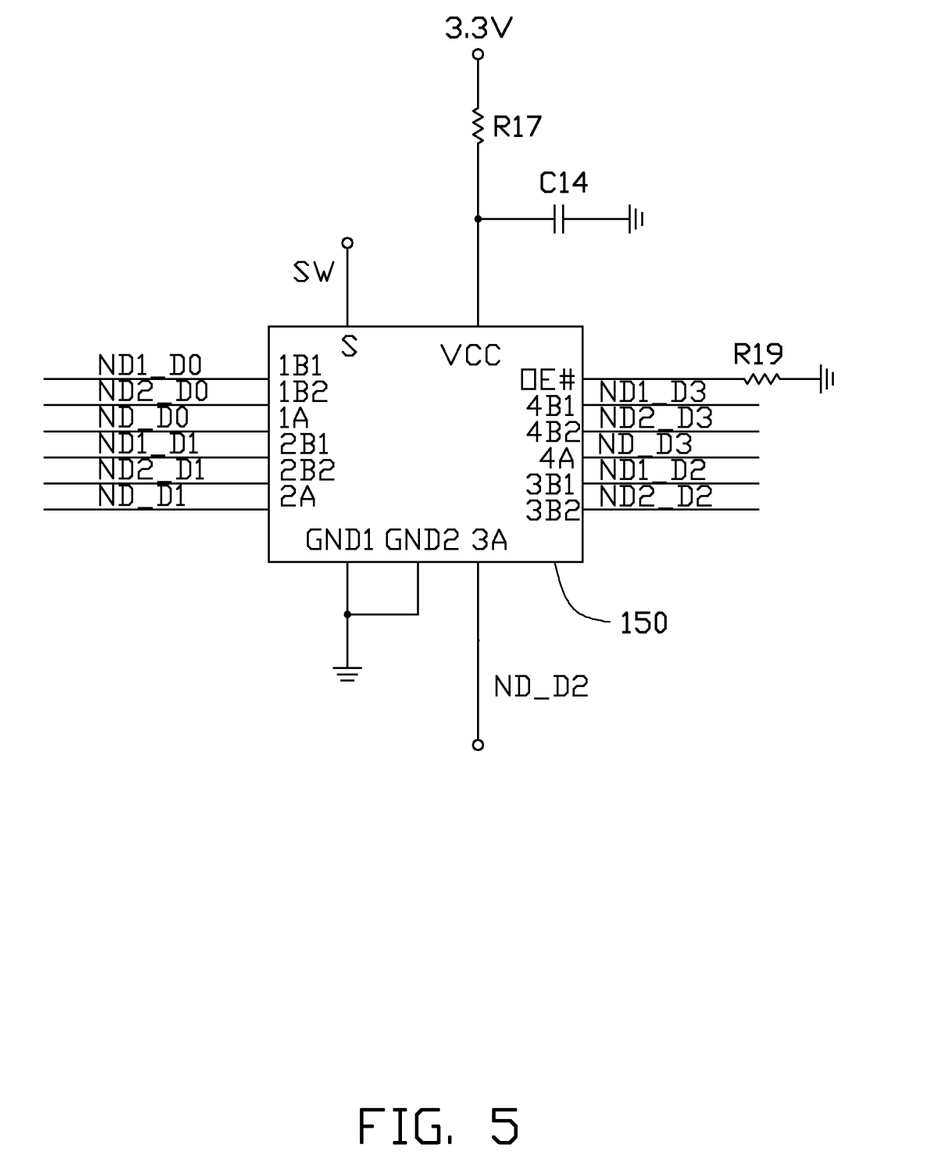
Figure 6:
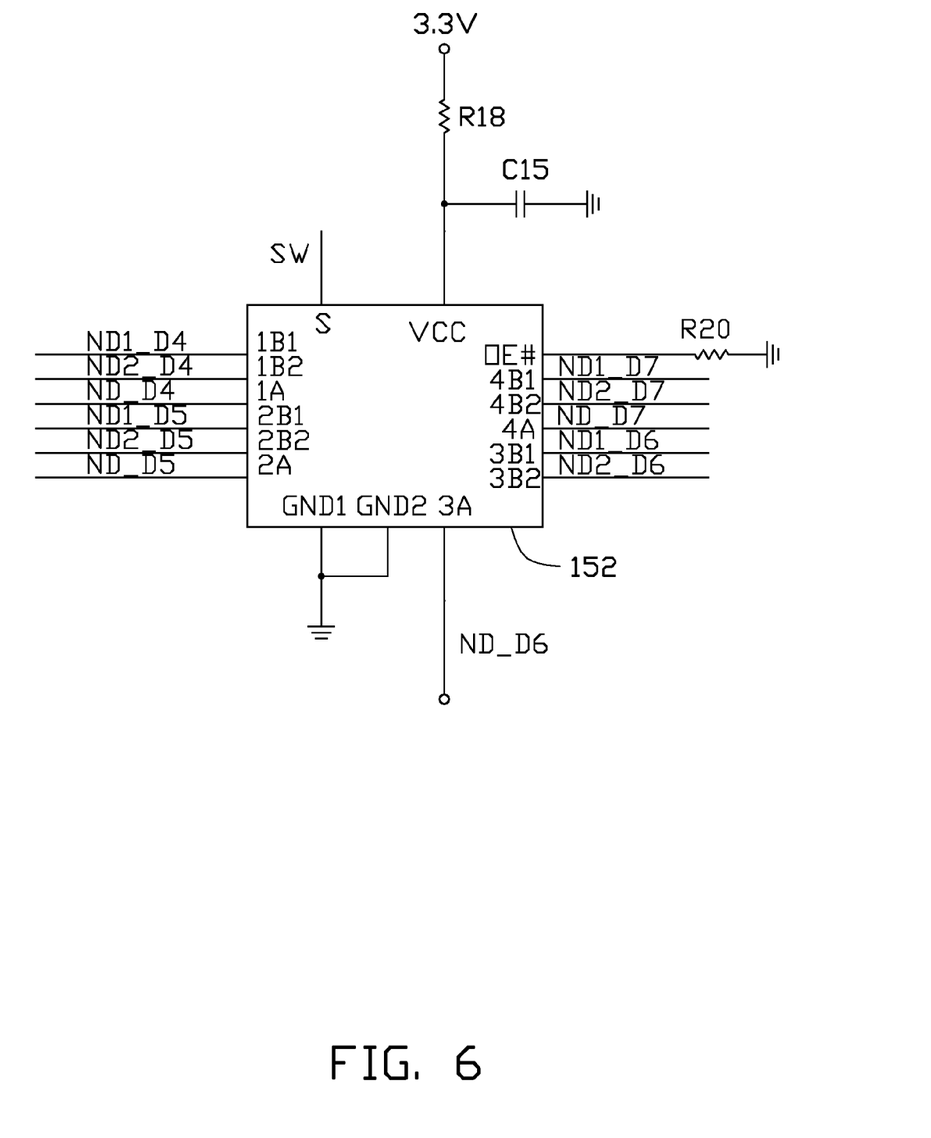
Figure 7:
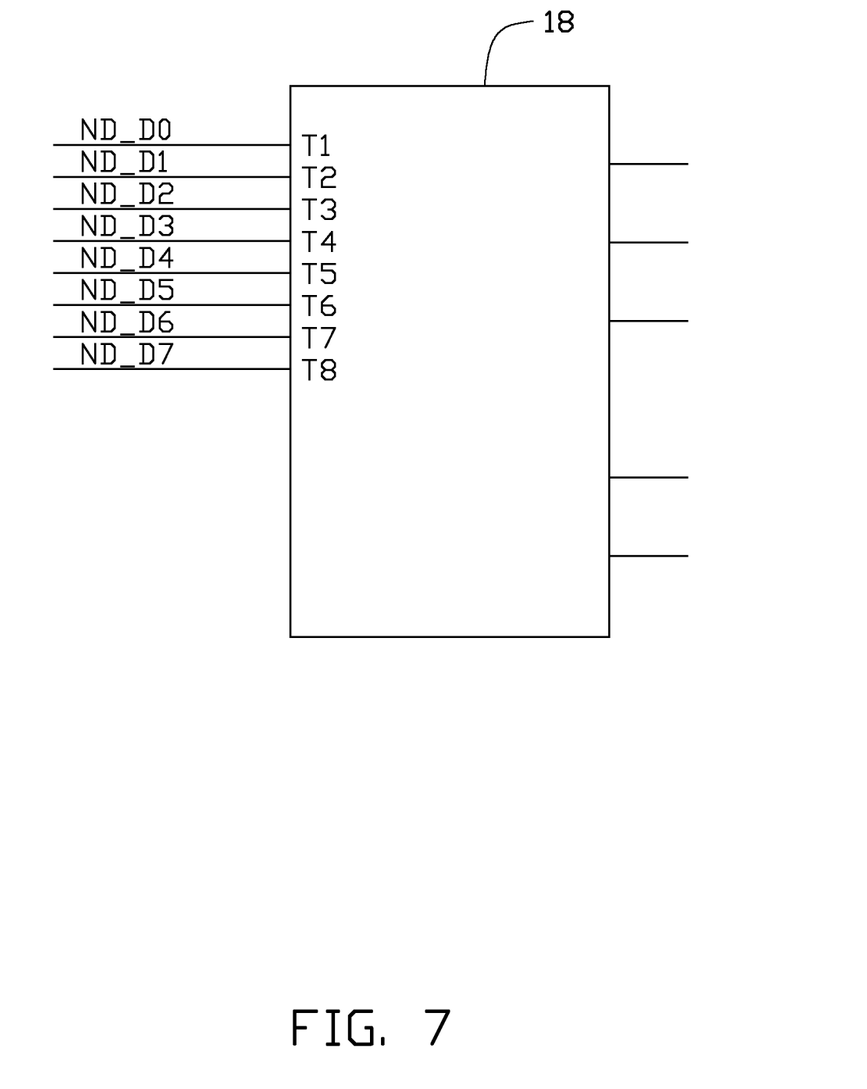

Referring to FIGS. 5 to 7, the switch control chip 15 includes a first control chip 150 and a second control chip 152. A power terminal VCC of the first control chip 150 is connected to the power supply V3.3 through a resistor R17, and is grounded through a capacitor C14. A power terminal VCC of the second control chip 152 is connected to the power supply V3.3 through a resistor R18, and is grounded through a capacitor C15. Control terminals S of the first control chip 150 and the second control chip 152 are connected to the node between the resistors R15 and R16, for receiving the control signal SW. Ground terminals GND1 and GND2 of the first control chip 150 and the second control chip 152 are grounded. An enable terminal OE# of the first control chip 150 is grounded through a resistor R19. An enable terminal OE# of the second control chip 152 is grounded through a resistor R20.

Data terminals 1A, 2A, 3A, and 4A of the first control chip 150 are respectively connected to data terminals T1, T2, T3, and T4 of the processing chip 18. Data terminals 1A, 2A, 3A, and 4A of the second control chip 152 are respectively connected to data terminals T5, T6, T7, and T8 of the processing chip 18. Data terminals 1B1, 2B1, 3B1, and 4B1 of the first control chip 150 are respectively connected to data terminals DQ0, DQ1, DQ2, and DQ3 of the first storage 100. Data terminals 1B1, 2B1, 3B1, and 4B1 of the second control chip 152 are respectively connected to data terminals DQ4, DQ5, DQ6, and DQ7 of the first storage 100. Data terminals 1B2, 2B2, 3B2, and 4B2 of the first control chip 150 are respectively connected to data terminals DQ0, DQ1, DQ2, and DQ3 of the second storage 200. Data terminals 1B2, 2B2, 3B2, and 4B2 of the second control chip 152 are respectively connected to data terminals DQ4, DQ5, DQ6, and DQ7 of the second storage 200. The power terminals VCC0 and VCC1 of the first storage 100 are connected to the first accessory circuit 120 for receiving the first power signal HDD_PWR1. The power terminals VCC0 and VCC1 of the second storage 200 are connected to the second accessory circuit 122 for receiving the second power signal HDD_PWR2. Ground pins VSS0 and VSS1 of the first storage 100 and the second storage 200 are grounded.

In the embodiment, a motherboard provides the power supply VDD_RTC and the power supply V3.3. The power supply VDD_RTC provides power all the time, and the power supply V3.3 provides power when the motherboard is powered on.

When the pole 2 contacts the first throw 1, the gate of the MOSFET Q2 receives a high level signal. The MOSFET Q2 is tuned on. During a period of 100 milliseconds after the power supply V3.3 provides power, the gate of the MOSFET Q1 receives a low level signal. The MOSFET Q1 is turned off. The MOSFET Q2 remains turned on. The MOSFET Q4 is turned off. The MOSFETs Q5 and Q6 are turned on. The first storage 100 is powered on. Meanwhile, the MOSFETs Q7 and Q11 are turned off. The second storage 200 is not powered on. In the embodiment, the resistor R2 and the capacitor C1 is an RC circuit. The 100 milliseconds are determined by parameters of the RC circuit.

In addition, each of the control terminals S of the first control chip 150 and the second control chip 152 receives a low level signal. Moreover, each of the enable terminals OE# of the first control chip 150 and the second control chip 152 is grounded. At this time, the data terminals 1A, 2A, 3A, and 4A of the first control chip 150 are respectively connected to the data terminals 1B1, 2B1, 3B1, and 4B1 of the first control chip 150. The data terminals 1A, 2A, 3A, and 4A of the second control chip 152 are respectively connected to the data terminals 1B1, 2B1, 3B1, and 4B1 of the second control chip 152. As a result, the data terminals T1-T8 of the processing chip 18 are respectively connected to the data terminals DQ0-DQ7 of the first storage 100. In other words, data can be transmitted between the first storage 100 and the processing chip 18.

Meanwhile, when the first storage 100 is powered on, the gate of the MOSFET Q3 receives a high level signal. The MOSFET Q3 is turned on. The gate of the MOSFET Q4 receives a low level signal. In this condition, even if the pole 2 is connected to the second throw 3, and the MOSFET Q2 is turned off, the MOSFET Q6 remains turned on. The first storage 100 is powered on. Furthermore, after the power supply V3.3 supplies power and after a 100 milliseconds delay, the gate of the MOSFET Q1 receives a high level signal. The MOSFET Q1 is turned on. In this condition, even if the pole 2 is connected to the second throw 3, the control terminals S of the first control chip 150 and the second control chip 152 receive low level signals. In other words, data cannot be transmitted between the second storage 200 and the processing chip 18.

When the pole 2 contacts the second throw 3, the gate of the MOSFET Q7 receives a high level signal. The MOSFET Q7 is turned on. During a period of 100 milliseconds after the power supply V3.3 provides power, the gate of the MOSFET Q1 receives a low level signal. The MOSFET Q1 is turned off. The MOSFET Q9 is turned off. The MOSFET Q10 is turned on. The MOSFET Q11 is turned on. The second storage 200 is powered on. Meanwhile, the MOSFETs Q2 and Q6 are turned off. The first storage 100 is not powered on.

In addition, each of the control terminals S of the first control chip 150 and the second control chip 152 receives a high level signal. Moreover, each of the enable terminals OE# of the first control chip 150 and the second control chip 152 is grounded. At this time, the data terminals 1A, 2A, 3A, and 4A of the first control chip 150 are respectively connected to the data terminals 1B2, 2B2, 3B2, and 4B2 of the first control chip 150. The data terminals 1A, 2A, 3A, and 4A of the second control chip 152 are respectively connected to the data terminals 1B2, 2B2, 3B2, and 4B2 of the second control chip 152. As a result, the data terminals T1-T8 of the processing chip 18 are respectively connected to the data terminals DQ0-DQ7 of the second storage 200. In other words, data can be transmitted between the second storage 200 and the processing chip 18.

Meanwhile, when the second storage 100 is powered on, the gate of the MOSFET Q8 receives a high level signal. The MOSFET Q8 is turned on. The gate of the MOSFET Q9 receives a low level signal. In this condition, even if the pole 2 is connected to the first throw 1, and the MOSFET Q7 is turned off, the MOSFET Q11 remains turned on. The second storage 200 is powered on. Furthermore, after the power supply V3.3 supplies power and after a 100 milliseconds delay, the gate of the MOSFET Q1 receives a high level signal. The MOSFET Q1 is turned on. In this condition, even if the pole 2 is connected to the first throw 1, the control terminals S of the first control chip 150 and the second control chip 152 receive high level signals. In other words, data cannot be transmitted between the first storage 100 and the processing chip 18.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A switch circuit for switching between a first storage and a second storage, the switch circuit comprising:
    a switch;
    a first control circuit connected to the switch;
    a second control circuit connected to the switch, the first storage, and the second storage, wherein the second control circuit either transmits power from a first power supply to the first or the second storage according to action of the switch; wherein when the second control circuit transmits power from the first power supply to the first storage, the first control circuit connects the second control circuit to the first power supply and the first storage regardless of the state of the switch, when the second control circuit transmits power from the first power supply to the second storage, the first control circuit connects the second control circuit to the first power supply and the second storage regardless of the state of the switch;
    a switch control chip connected to the second control circuit, the first storage, and the second storage; and
    a processing chip connected to the switch control chip, wherein the second control circuit controls the switch control chip to either transmit data between the processing chip and the first storage in response to the first power supply powering the first storage, or transmit data between the processing chip and the second storage in response to the first power supply powering the second storage; wherein when the second control circuit transmits data between the processing chip and the first storage, the first control circuit connects the second control circuit to the processing chip and the first storage regardless of the state of the switch, when the second control circuit transmits data between the processing chip and the second storage, the first control circuit connects the second control circuit to the processing chip and the second storage regardless of the state of the switch.

2. The switch circuit of claim 1, wherein the switch is a single pole double throw switch, the first control circuit comprises a first metal oxide semiconductor field effect transistor (MOSFET), a gate of the first MOSFET is grounded through a first capacitor, the gate of the first MOSFET is further connected to the first power supply through a first resistor, a source of the first MOSFET is grounded, a drain of the first MOSFET is connected to a pole of the switch; wherein the second control circuit comprises a first accessory circuit and a second accessory circuit, the pole of the switch is connected to a second power supply, a first throw of the switch is connected to the first accessory circuit, a second throw of the switch is connected to the second accessory circuit; when the pole is connected to the first throw, the first accessory circuit transmits power from the first power supply to the first storage, and controls the switch control chip to transmit data between the processing chip and the first storage; when the pole is connected to the second throw, the second accessory circuit transmits power from the first power supply to the second storage, and controls the switch control chip to transmit data between the processing chip to the second storage.

3. The switch circuit of claim 2, wherein the first accessory circuit comprises second to sixth MOSFETs, a gate of the second MOSFET is connected to the first throw of the switch, a source of the second MOSFET is grounded, a drain of the second MOSFET is connected to the first power supply through a second resistor, the drain of the second MOSFET is further connected to a drain of the third MOSFET and a gate of the fourth MOSFET, a source of the third MOSFET is grounded, a source of the fourth MOSFET is grounded, a drain of the fourth MOSFET is connected to the first power supply through a third resistor, the drain of the fourth MOSFET is connected to a gate of the fifth MOSFET, a source of the fifth MOSFET is grounded, a drain of the fifth MOSFET is connected to a gate of the sixth MOSFET, a source of the sixth MOSFET is connected to the first power supply, a drain of the sixth MOSFET is connected to power terminals of the first storage, the drain of the sixth MOSFET is further connected to the gate of the third MOSFET through a fourth resistor.

4. The switch circuit of claim 2, wherein the second accessory circuit comprises second to sixth MOSFETs, a gate of the second MOSFET is connected to the second throw of the switch, a source of the second MOSFET is grounded, a drain of the second MOSFET is connected to the first power supply, the drain of the second MOSFET is connected to a drain of the third MOSFET and a gate of the fourth MOSFET, a source of the third MOSFET is grounded, a source of the fourth MOSFET is grounded, a drain of the fourth MOSFET is connected to the first power supply through a third resistor, the drain of the fourth MOSFET is connected to a gate of the fifth MOSFET, a source of the fifth MOSFET is grounded, a drain of the fifth MOSFET is connected to a gate of the sixth MOSFET, a source of the sixth MOSFET is connected to the first power supply, a drain of the sixth MOSFET is connected to power terminals of the second storage, the drain of the sixth MOSFET is further connected to the gate of the third MOSFET through a fourth resistor, the drain of the sixth MOSFET is further grounded through fifth and sixth resistors in series, a node between the fifth and sixth resistors is connected to the switch control chip.

5. The switch circuit of claim 1, wherein the switch control chip comprises a first control chip and a second control chip, control terminals of the first and second control chips are connected to the second control circuit, enable terminals of the first and second control chip are grounded, a first group of data terminals of the first control chip are respectively connected to a first group of data terminals of the processing chip, a second group of data terminals of the first control chip are respectively connected to a first group of data terminals of the first storage, a third group of data terminals of the first control chip are respectively connected to a first group of data terminals of the second storage, a first group of data terminals of the second control chip are respectively connected to a second group of data terminals of the processing chip, a second group of data terminals of the second control chip are respectively connected to a second group of data terminals of the first storage, a third group of data terminals of the second control chip are respectively connected to a second group of data terminals of the second storage; when the control terminal of the first control chip receives a low level signal, the first group of data terminals of the first control chip are respectively connected to the second group of data terminals of the first control chip, when the second control terminal of the first control chip receives a high level signal, the first group of data terminals of the first control chip are respectively connected to the third group of data terminals of the first control chip; when the control terminal of the second control chip receives a low level signal, the first group of data terminals of the second control chip are respectively connected to the second group of data terminals of the second control chip, when the control terminal of the first control chip receives a high level signal, the first group of data terminals of the second control chip are respectively connected to the third group of data terminals of the second control chip.

* * * * *